(12) United States Patent
O'Neil

(10) Patent No.: US 9,697,560 B2
(45) Date of Patent: Jul. 4, 2017

(54) PRODUCT PALLETIZING SYSTEM

(71) Applicant: Encompass Technologies LLP, Fort Collins, CO (US)

(72) Inventor: Jonathan W. O'Neil, Fort Collins, CO (US)

(73) Assignee: Encompass Technologies LLP, Fort Collins, CO (US)

( * ) Notice: Subject to any disclaimer, the term of this patent is extended or adjusted under 35 U.S.C. 154(b) by 0 days.

(21) Appl. No.: 15/161,755

(22) Filed: May 23, 2016

(65) Prior Publication Data

US 2016/0340134 A1 Nov. 24, 2016

Related U.S. Application Data

(60) Provisional application No. 62/164,777, filed on May 21, 2015.

(51) Int. Cl.
*G06F 7/00* (2006.01)
*G06Q 30/06* (2012.01)
*G06Q 10/08* (2012.01)

(52) U.S. Cl.
CPC ..... *G06Q 30/0635* (2013.01); *G06Q 10/0875* (2013.01)

(58) Field of Classification Search
USPC ........................................................ 700/217
See application file for complete search history.

(56) References Cited

U.S. PATENT DOCUMENTS

| | | | |
|---|---|---|---|
| 7,797,204 | B2 | 9/2010 | Balent |
| 7,934,650 | B2 | 5/2011 | Silverbrook et al. |
| 7,949,568 | B2 | 5/2011 | Fano et al. |
| 8,091,782 | B2 | 1/2012 | Cato et al. |
| 8,146,799 | B2 | 4/2012 | Kempf et al. |
| 8,620,772 | B2 | 12/2013 | Owen |
| 2009/0063307 | A1 | 3/2009 | Groenovelt et al. |
| 2013/0297464 | A1 | 11/2013 | Jaquez et al. |
| 2015/0307278 | A1* | 10/2015 | Wickham ............... G05B 15/02 700/216 |
| 2016/0110793 | A1* | 4/2016 | Herring ............. G01G 19/4144 705/26.64 |

OTHER PUBLICATIONS

U.S. Appl. No. 62/164,777, filed May 21, 2015.

* cited by examiner

*Primary Examiner* — Kyle Logan
(74) *Attorney, Agent, or Firm* — Craig R. Miles; CR Miles P.C.

(57) ABSTRACT

A computer-implemented product palletizing system and a method of product palletizing which includes processor in communication with a memory element containing a computer code executable to coordinate the discrete activities of one or more pickers and conveyor product sorting assembly to allocate a plurality of products to a plurality of pallets.

10 Claims, 2 Drawing Sheets

FIG. 2

| PALLET ID | DATE | CUSTOMER | INVOICE | WAVE | LANE | TIME CREATED |
|---|---|---|---|---|---|---|
| 57715  13A | 4/1/2015 | 1965 HOMETOWN LIQUOR  42A | W-790642  51A | 1  47A | 1  52A | 3/31/2015  12:15PM  50A |
| 57713  13B | 4/1/2015 | 918 REDD'S LIQUORS  42B | W-790648  51B | 1  47A | 2  52B | 3/31/2015  12:15PM  50A |
| 57717  13C | 4/1/2015 | 109 HOLYOKE MARKET PLACE  42C | W-790640  51C | 2  47B | 3  52C | 3/31/2015  1:23PM  50B |
| 57723 | 4/1/2015 | 1970 THE SKILLET | W-790649 | 3 | 4 | 3/31/2015  1:33PM |
| 57726 | 4/1/2015 | 1870 HAXTUN LIQUORS | W-790637 | 4 | 1 | 3/31/2015  1:54PM |
| 57728 | 4/1/2015 | 1980 HOLYOKE VET CLUB INC. | W-790641 | 4 | 2 | 3/31/2015  1:54PM |
| 57734 | 4/1/2015 | 2300 SEDGWICK LIQUOR | W-790611 | 5 | 3 | 3/31/2015  2:26PM |
| 57730 | 4/1/2015 | 2065 JJLIQUORS | W-790600 | 5 | 4 | 3/31/2015  2:26PM |
| 57731 | 4/1/2015 | 2065 JJLIQUORS | W-790600 | 6 | 1 | 3/31/2015  2:26PM |
| 57737 | 4/1/2015 | 2060 MELODY LANES 5207173 | W-790607 | 7 | 2 | 3/31/2015  2:50PM |
| 57751 | 4/1/2015 | 908 TIPSY TURTLE | | 8 | 3 | 3/31/2015  2:50PM |

PRODUCT PALLETIZING SYSTEM

This United States Non-Provisional Patent Application claims the benefit of U.S. Provisional Patent Application No. 62/164,777, filed May 21, 2015, hereby incorporated by reference herein.

I. FIELD OF THE INVENTION

A computer-implemented product palletizing system and a method of product palletizing which includes a processor in communication with a memory element containing a computer code executable to generate a plurality of product lists correspondingly associated with a plurality of customer identifiers and to identify all the conveyor products within the plurality of lists to allow all the conveyor products in the plurality of product lists to be included in one pick for subsequent automated product image recognition and product sorting between a plurality of conveyor lanes each associated with a customer identifier and pallet identifier, thereby eliminating a discrete pick associated with each one of the plurality of product lists.

II. BACKGROUND

Conventional product picking involves picking a plurality of products from inventory located in a general warehouse area based on one list of products associated with one customer identifier (also referred to as an "order"). That is, one or more pickers pick a plurality of orders serially one order at a time (also referred to as "a one by one picking system.") In conventional one by one picking systems, product indicators associated with the plurality of products to be picked for one order are activated to instruct the one or more pickers to pick that plurality of products to fill that one order. As products have become more diverse the plurality of products within each order has become correspondingly more diverse and the picked product count of each picked product within one order can be low in number. As a result, a substantial amount of labor can be expended in performance of a conventional one by one picking system.

III. SUMMARY OF THE INVENTION

Accordingly, a broad object of the invention can be to provide a computer implemented product palletizing system which allows one or more pickers to concurrently pick a plurality of products for a plurality of orders associated with a plurality of customer identifiers, including at least one processor in communication with at least one memory element which contains at least one computer code executable to generate a plurality of product lists correspondingly associated with a plurality of customer identifiers, each product list may contain a plurality conveyor products. The computer code can be further executable to identify a plurality of conveyor products in the plurality of product lists and activate a conveyor product indicator in association with each the conveyor products within the plurality of products in the plurality of product lists which allows one or more pickers to concurrently pick a plurality of conveyor products for a plurality of orders associated with a plurality of customer identifiers. The computer code can be further executed to operate a product conveyor sorter assembly which identifies and sorts each of the conveyor products into a plurality of conveyor lanes each corresponding to one customer identifier associated with a corresponding one product pallet identifier.

Another broad object of the invention can be to retrofit an existing "one by one picking system" including a first a processor in communication with a first memory element which contains a first computer code executable to generate a plurality of product lists each one correspondingly associated with one customer identifier to or with a second computer code executable to download the plurality of product lists associated with a plurality of customer identifiers from the first memory element and identify each conveyor product within the plurality of products within the plurality of product lists and activate a conveyor product indicator in association with each the conveyor product to allow one or more pickers to concurrently pick a plurality of conveyor products within a plurality of orders associated with a plurality of customer identifiers. The computer code can be further executed to operate a product conveyor sorter assembly which identifies and sorts each of the conveyor products into a plurality of conveyor lanes each corresponding to one client identifier associated with a corresponding one pallet identifier.

Another broad object of the invention can be to control the discrete activities of one or more first pickers to pick a plurality of conveyor products associated with a correspondingly plurality of conveyor product indicators activated in association with each of the plurality of conveyor products in a plurality of orders associated with a plurality of customer identifiers and to position the plurality of conveyor products on a product conveyor sorter assembly which operates to identify and sort each of the conveyor products into one of a plurality of conveyor lanes each corresponding to one client identifier associated with a corresponding one pallet identifier and to further coordinate the discrete activities of one or more second pickers to move the plurality of conveyor products from each of the plurality of conveyor lanes to a corresponding one of a plurality of product pallets.

Naturally, further objects of the invention are disclosed throughout other areas of the specification, drawings, photographs, and claims.

IV. A BRIEF DESCRIPTION OF THE DRAWINGS

FIG. 2 is an illustration of an interactive graphical user interface in which an administrator can create one or more picked product waves which can be displayed on the display surface of a computer device.

V. DETAILED DESCRIPTION OF THE PREFERRED EMBODIMENTS

Figure 1:
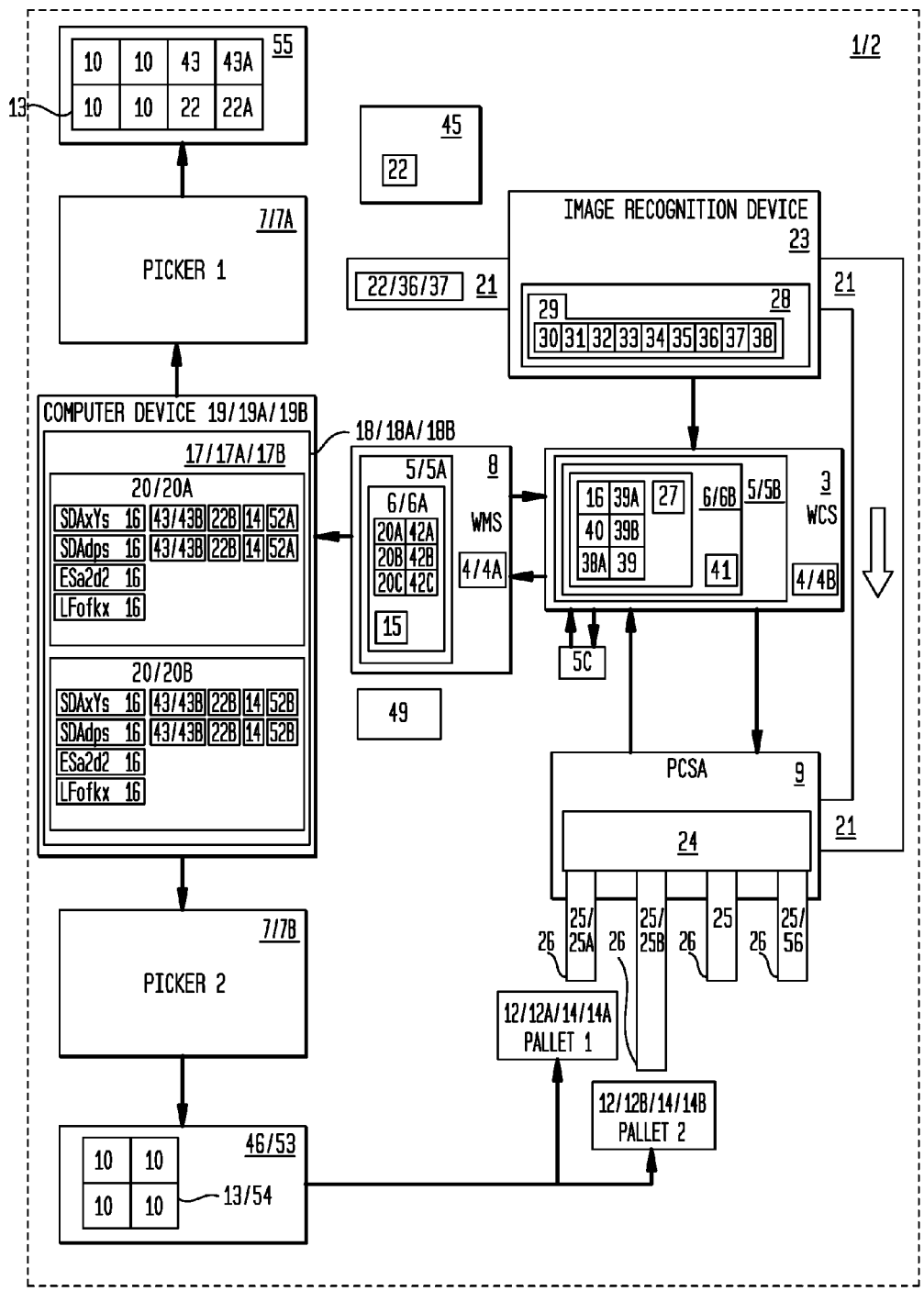
FIG. 1 is a block diagram of an embodiment of the inventive product palletizing system and method of palletizing products.

Now referring to FIG. 1, which provides an overview of an illustrative embodiment of an inventive computer-implemented product palletizing system (1) and a method of palletizing products (2) including a warehouse control system ("WCS") (3) which includes at least one processor (4) in communication with at least one memory element (5) which contain(s) a computer code (6) executable to control the discrete activities of one or more pickers (7) through a computer-implemented warehouse management system ("WMS") (8) in relation to the operation of a product conveyor sorter assembly (9) ("PCSA") which identifies and sorts picked products (10) to a plurality of product pallets (12).

The term "picked product" for the purposes of this invention means any discrete material thing which can be picked, and without limitation to the breadth of the forgoing, including: an article, an object, an item, a commodity, a product, an artifact, consumer goods, or the like, whether individually or collectively encased, and combinations thereof.

The term "conveyor product" for the purposes of this invention means a picked product (10) which can be identified and sorted by a PCSA (9).

The term "pick or picked or picking" for the purpose of this invention means to choose or select a picked product (10) individually or from among a plurality of products (13).

The term "picker" for the purposes of this invention means a person or a machine or combination thereof that picks a picked product (10) individually or from among a plurality of products (13).

The term "pick count" for the purposes of this invention means a pre-selected number of picked products (10).

The term "product pallet" for the purposes of this invention means a portable platform or pallet on which picked products (10) can or have been placed, positioned, or located. Each product pallet (12) can correspondingly have a product pallet identifier (14).

The term "identifier" for the purpose of this invention means a sequence of characters, symbols, images, or indicia used to identify or refer to an object or thing including as examples: products, picked products, conveyor products, pallets, or the like.

The term "warehouse management system" ("WMS") for the purposes of this invention means the computer code (6) having at least a product picking module (15) executable to activate a picked product identifier (16) associated with each picked product (10) or display a graphical user interface (17) on the display surface (18) of computer device (19) which associates a product identifier (16) with each one of a plurality of picked products (10) in one or more picked product lists (20) viewable by one or more pickers (7) to allow picking of picked products (10). As one example of a WMS (8), U.S. Provisional Patent Application No. 62/027,176 entitled "Case By Case Picking Weight Audit System" is hereby incorporated by reference herein.

The term "computer device" for the purposes of this invention means any device having a display surface (18) adapted to display the graphical user interface (17) upon execution of the product picking module (15) and without limitation to the foregoing broad definition, the computer device (19) can take the form of a portable limited-capability computer, set-top boxes, intelligent televisions connected to receive data through an entertainment medium such as a cable television network or a digital satellite broadcast, hand-held devices such as smart phones (whether iOS or Android operating system), slate or pad computers, personal digital assistants or camera/cell telephones, or multiprocessor systems, microprocessor-based or programmable consumer electronics, network personal computers, minicomputers, mainframe computers, or the like, or combinations thereof.

The term "computer code" for the purposes of this invention means computer-executable instructions which utilize programs, modules, routines, objects, components, data structures, or the like, to perform particular functions or tasks or implement particular abstract data types, or the like, it is not intended that any embodiments of the invention be limited to a particular set of computer-executable instructions or protocols.

The term "product conveyor sorter assembly ("PCSA")" for the purposes of this invention means a conveyor element (21) adapted for the conveyance of conveyor products (22) in relation to an image recognition device (23) which identifies each conveyor product (22) and further including a conveyor sorter (24) operable to sort conveyor products (22) based on picked product identifiers (16) matched to a picked product list (20) into one of a plurality of conveyor lanes (25) each having conveyor lane terminal end (26) in proximity to one of a plurality of product pallets (12) each having a corresponding product pallet identifier (14).

The term "image recognition device" for the purposes of this invention means a device responsive to an image recognition module (27) included in the computer code (6) of the WCS (3) which controls the operation image capture element (28) configured to capture a picked product image (29) of a conveyor product (22). The picked product image (29) can be inclusive of one image (30), or a plurality of images (31) taken from dissimilar picked product views (32), such as top view (33), side view (34) or end view (35), and combinations thereof. The one or more picked product images (29) include a sufficient number of picked product views (32) to allow a plurality of conveyor products (22) to be differentiated based on picked product configuration (36) rather than by a picked product code (38) represented on the conveyor product (22). The picked product configuration (36) includes the entirety or a portion of a picked product imageable surface (37) captured in picked product image (29) including a picked product surface area, picked product dimensions, picked product aperture elements, picked product color, picked product texture, or the like, and combinations thereof. As to particular embodiments, the picked product image (29) can, but does not necessarily, include one or more picked product codes (38) such as a Universal Product Code, European Article Number, Japanese Article Number, International Standard Book Number, Manufacturer Part Number, Brand, or the like. As to particular embodiments, the image recognition module (27) can further function to compare each picked product image (29) to a plurality of product image templates (39) retrieved from a picked product image template database (40). Each of the plurality of product image templates (39) can be coupled or linked to a picked product identifier (16) corresponding to the picked product (10). Accordingly, a match between the picked product image (29) and one of the plurality of product image templates (39) can serve to differentiate one conveyor product (22) from a plurality of conveyor products (22) based solely or in part upon picked product configuration (36). As to particular embodiments, the picked product code (38) included in the picked product image (29) can be compared to a plurality of picked product code templates (38A) providing the basis for differentiating one conveyor product (22) from a plurality of conveyor products (22) based on picked product codes (38). Understandably, the two modes of differentiation can, to a greater or lesser extent, be combined.

The term "warehouse control system" for the purposes of this invention means a computer implemented system including at least one processor (4) in communication with at least one memory element (5) containing a computer code (6) including in part a product palletizing module (41) executable to download each of a plurality of product lists (20A, 20B, 20C . . . ) from the WMS (8) to coordinate the picking of picked products (10) by one or more pickers (7) with the operation of the image recognition device (23) and the PCSA (9) to correctly locate a plurality of picked products (10) onto one or a plurality of product pallets (12).

Now referring primarily to FIGS. 1 and 2, a particular embodiment of the computer-implemented product palletizing system (1) includes a WMS (8) having a first processor (4A) in communication with a first memory element (5A) which contains a first computer code (6A) executable to generate a plurality of product lists (20A, 20B, 20C . . . ) each one containing a plurality of picked products (10) and each one correspondingly associated with one customer identifier (42A)(42B)(42C)(each an "order"). As to particular embodiments, the WMS (8) can operate as a "one by one picking system" which activates a plurality of picked product indicators associated with one of a plurality of (43), whether concurrently or serially, in association with a plurality of picked products (10) contained in one of the plurality of product lists (20A, 20B, 20C . . . ) associated with one customer identifier (42A)(42B)(42C). Activation of the plurality of product indicators (43) in association with a plurality of picked products (10) instructs one or more pickers (7) to pick the plurality of picked products (10) associated with one product list (20A)(20B) or (20C) and place that plurality of picked products (10) on a corresponding one of a plurality of pallets (12) to fill one order.

Certain embodiments of the WMS (8) may include the plurality of product indicators (43) as a plurality of light sources (43A) which can be activated by execution of the first computer code (6A) to emit a visually observable amount of light having a location associable with one of the plurality of picked products (10). In that instance, illumination of one or more light sources (43A) can instruct the one or more pickers (7) to pick the plurality of picked products (10) associated with the illuminated light sources (43A) to fill one order. As to certain other embodiments of the WMS (8), the first computer code (6A) can be executed to generate a graphical user interface (17) on a display surface (18) of a computer device (19) in which the product list (20) containing the plurality of picked products (10) can be displayed along with a plurality of depicted product indicators (43B). Illumination or depiction of the plurality of product indicators (43)(43A)(43B) associated with a corresponding plurality of picked products (10) instructs the one or more pickers (7) to pick the plurality of picked products (10) associated with the illuminated or depicted plurality of product indicators (43)(43A)(43B) to fill one order.

The WMS (8), above described, can be retrofitted or combined with a WCS (3) including one or more of: a second processor (4B) in communication with a second memory element (5B) which contains a second computer code (6B). The second computer code (6B) can be executed to modify the one by one picking system of an existing WMS (8). In a particular embodiment, the second computer code (6B) operates to download a plurality of product lists (20A, 20B, 20C . . . ) corresponding to a plurality of customer identifiers (42A)(42B)(42c) (also referred to as "a plurality of orders (44)" as shown in the example of FIG. 2) from the first memory element (5A) of the WMS (8). The second computer code (6B) can be further executed to identify each of a plurality of conveyor products (22) within the plurality of picked products (10) in the plurality of product lists (20A, 20B, 20C . . . ). The second computer code (6B) can be further executed to associate a customer identifier (42) and product pallet identifier (14) with each conveyor product (22). The second computer code (6B) can be further executed to activate or depict a conveyor product indicator (22A) viewable by one or more pickers (7) to allow concurrent picking of all the conveyor products (22) within a plurality of product lists (20A, 20B, 20C . . . ) associated with a plurality of customer identifiers (42A, 42B, 42C . . . ) to fill a plurality of orders (44).

The second computer code (6B) can be further executed to operate a product conveyor sorter assembly (9), including one or more conveyors (21), an image recognition device (23) and a conveyor product sorter (24). The conveyor (21) can be any type of conveyor system configured to move the type and kind of conveyor products (22) picked by the one or more pickers (7) to concurrently fill a plurality of orders (44), including as illustrative examples: an overhead chain conveyor, a vibrating conveyor, a flexible conveyor, a vertical conveyor, a belt conveyor, a roller conveyor, or the like. The conveyor (21) moves the conveyor products (22) to an image recognition device (23) which captures a picked product image (29) of each conveyor product (22) and identifies the conveyor product (22) based upon comparison of the picked product image (29) to plurality of product image templates (39) in a product image template database (40) which can be disposed in the first or second memory element (5A)(5B) or in a remote memory element (5C) communicatively coupled to the WMC (3) or WMS (8). The second computer program (6B) can be further executed to operate the conveyor (21) to move identified conveyor products (22) to a conveyor product sorter (24) which sorts each of a plurality of conveyor products (22) identified by the image recognition device (23) into corresponding one of a plurality of conveyor lanes (25) based on the product pallet identifier (14) or customer identifier (42) associated with the conveyor product (22).

Again referring primarily to FIGS. 1 and 2, as to particular embodiments of the computer-implemented product palletizing system (1) includes a processor (4) in communication with a memory element (5) which contains a computer code (6) executable to afford all the functionalities of the WMS (8) and the WCS (3), above described.

Again referring primarily to FIGS. 1 and 2, an embodiment of the computer implemented product palletizing system (1) can further include a first computer device (19A) (whether a first one or a first plurality of computer devices) capable of interaction with first picker (7A)(whether a first one or a first plurality of pickers). The computer code (6) can be further executed to depict a first graphical user interface (17A) on a first display surface (18A) of the first computer device (19A) including a depicted conveyor product indicator (22B) associated with each of the plurality of conveyor products (22) within the plurality of picked products (10) in the plurality of product lists (20A, 20B, 20C . . . ) allowing the first picker (7A) to concurrently pick each of the plurality of conveyor products (22) in a plurality of lists (20A, 20B, 20C . . . ) having a plurality of customer identifiers (42) to concurrently fill a plurality of orders (44). The embodiment of the computer implemented computer system can further include a second computer device (19B) (whether a second one or a second plurality of computer devices) capable of interaction with a second picker (7B) (whether a second one or a second plurality of pickers). The computer code (6) can be further executed to depict a second graphical user interface (17B) on a second display surface (18B) of the second computer device (19B) including a product pallet identifier (14) associated with one of the plurality of conveyor lanes (25) allowing the second picker (17B) to move conveyor products (22) from each of the plurality of conveyor lanes (25) to a corresponding plurality of product pallets (12) each having an associated customer identifier (42).

Again referring to FIGS. 1 and 2, as to particular embodiments, the computer code (6) can further be executed to associate a product pallet identifier (14) with each of the plurality of picked products (10) not identified as conveyor products (22) to instruct the second picker (7A) to pick each of the plurality of picked products (10) not identified as conveyor products (22) and to move the plurality of picked products (10) not identified as conveyor products (22) to the corresponding one of the plurality of product pallets (12) having the product pallet identifier (14) associated with each corresponding one of the plurality of picked products (10).

Again referring to FIGS. 1 and 2, embodiments of the computer implemented product palletizing system (1) can further include a first slip (45) at which a first picker (7A) can locate conveyor products (22) proximate the conveyor (21) which delivers conveyor products (22) to the image recognition device (23) for identification and subsequent sorting by a PSCA (9). For the purposes of this invention the term "slip" is defined as a docking place for conveyor products (22) to be temporarily located before being moved onto a PSCA (9). As to certain embodiments, there may be a plurality of first slips (45).

Again referring to FIGS. 1 and 2, embodiments of the computer implemented product palletizing system (1) can further include a second slip (46) at which a plurality of picked products (10) not identified as conveyor products (22) but associated with a product pallet identifier (14) can be temporarily located before being moved to one of the plurality of product pallets (12) associated the corresponding product pallet identifier (14).

Again referring to FIGS. 1 and 2, as to particular embodiments, the computer code (6) can be further executed to generate a picked product wave (47). A picked product wave (47) associates a plurality of product lists (20A, 20B, 20C . . . ) with a corresponding plurality of customer identifiers (42A, 42B, 42C . . . ) with a picked product wave identifier (48). The computer code (6) can be further executable to prioritize order in which a first picker (7A) or a first picker (7A) and a second picker (7B) picks a plurality of conveyor products (22) and a plurality of picked products (10) that are not conveyor products (22) within each of a plurality of picked product waves (47).

Now referring primarily to FIGS. 1 and 2, an exemplary method of using the product palletizing system (1) includes execution of a product picking module (15) of the computer code (6) of the product palletizing system (1) (whether being a first computer code (6A) modified by retrofit of a second computer code (6B) associated with the WCS (3) or as an unmodified computer code (6) including all the functionalities of the WMS (8) first computer code (6A) and the WCS (3) second computer code (6B) which allows a WMS administrator (49) to transition from a "one by one picking system", as above described, to picking by picked product waves (47). Accordingly, the product picking module (15) allows the WMS administrator (49) to generate one or more product picking waves (47) each having a picked product wave identifier (48). Each product picking wave (47) includes one or more picked product lists (20) (identified in the example of FIG. 1 as 20A, 20B, 20C et seq.) each associated with one or more customer identifiers (42A, 42B, 42C . . . ). As further shown by the example of FIGS. 1 and 2, execution of the computer code (6) generates and displays product lists 20A and 20B associated with a first picked product wave (47A) on the display surface (18) of at least a first computer device (19A). Each picked product list (20A) (20B), can be associated with one or more of: a customer identifier (42), an invoice identifier (51), a product pallet identifier (14) and one of a plurality of product conveyor lane identifiers (52).

Now referring primarily to FIG. 2, as illustrative examples, the first picked product wave (47A) has a picked product wave creation time (50A) ("12:15 PM") and includes the picked product lists (20A)(20B)(as shown in the example of FIG. 1) each correspondingly associated with one of two customers identifiers (42A)(42B) ("1965 Hometown Liquor" and "Redd's Liquors"), one of two invoice identifiers (51A)(51B) ("W-790642" and "W-790648"), one of two picked product pallet identifiers (14A)(14B) ("57715" and "57713") and one of two picked product conveyor lane identifiers (52A)(52B) ("1" and "2"). A second picked product wave (47B) has a picked product wave creation time (50B) ("1:23 PM") associated with one customer identifier (42C) ("109 Holyoke Market Place"), one invoice identifier (51C) ("W-790640"), one picked product pallet identifier (14C) ("57717"), and one conveyor lane identifier (52C) ("3").

Accordingly, the WMS administrator (49) can create one or more picked product waves (47) throughout a day as above described and the computer code (6) can be executed to generate the corresponding picked product lists (20) within each picked product wave (47) which can be displayed on the display surface (18) of a computer device (19) along with one or more of the corresponding: customer identifier(s)(42), picked product identifier(s) (16), picked product pallet identifier(s) (14) and conveyor lane identifiers (52).

Again referring primarily to FIG. 1, each picked product list (20) within a picked product wave (47) can include a plurality of picked product identifiers (16) allocated to one of a plurality of product pallets (12) having a unique product pallet identifier (14). The product picking module (15) can be further function to associate a conveyor product indicator (22A) to those picked products (10) to be located in a first slip (45) to be sorted by the PCSA (9). Those picked products (10) that are not associated with a conveyor product indicator (22A), can be located in the second slip (46) and can be placed directly on the corresponding one of the plurality of product pallets (12) having the associated pick product pallet identifier (14).

As one example, the product picking module (15) of the WMS (8) can generate a first picked product wave (47A) including a first picked product list (20A) associated with a first product pallet (12A) having a first product pallet identifier (14A) and a second picked product list (20B) associated with a second picked product pallet (12B) having a second product pallet identifier (14B). While the example of a first picked product wave (47A) includes first and second picked product lists (20A)(20B), this is not intended to limit the number of picked product lists (20) that can be concurrently generated and included in a picked product wave (47) by execution of the product picking module (15) of the WMS (8).

The product picking module (15) of the WMS (8) can further function to coordinate the activities of a first picker by prioritizing and instructing a first picker (7A) to pick picked products (10) displayed in a first picked product list (20A) within the first picked product wave (47A) and to place picked products (10) on the product pallet (12A) having the product pallet identifier (14A) associated with the first picked product list (20A) to achieve a one by one picking system, if desired.

Particular embodiments, the computer code (6) of the WMS (8) can be executed to coordinate the activities of a first picker (7A) to pick all the picked products (10) contained in a plurality of picked product lists (20A, 20B, 20C . . . ) in the first picked product wave (47A) associated with a conveyor product indictor (40)(whether "pick to light" or "pick to depiction") in a preselected order and move the picked conveyor products (22) to the first slip (45) proximate the PCSA (9).

The product palletizing module (41) of the WCS (3) can be further executed to operate the PCSA (9). In the above example, a product palletizing module (41) of the WCS can function to download the first and second picked product lists (20A)(20B) of the first picked product wave (47A) and subsequently associate the first product pallet identifier (14A) associated with the first product list (20A) with a first conveyor lane (25A) and associate the second picked product pallet identifier (14B) associated with the second picked product list (20B) with a second conveyor lane (25B). The product palletizing module (41) can further function to update the product picking module (15) of the WMS (8) to correspondingly associate with the first and second picked product lists (20A)(20B) the first and second conveyor lane identifiers (52A)(52B). The product picking module (15) of the WMS (8) can display instructions for a second picker (7B) to locate the first product pallet (12A) associated with the first conveyor lane identifier (52A) proximate the first conveyor lane (25A) and locate the second product pallet (12B) associated the second conveyor lane identifier (52B) proximate the second conveyor lane (25B).

The updated product picking module (15) of the WMS (8) can further instruct the first picker (7A) to locate picked products (10) from the first and second picked product lists (20A)(20B) having a conveyor product indicator (22A)(22B) onto the conveyor element (21) of the PCSA (9). The PCSA (9) under control of the product palletizing module (41) of the WCS (3) then conveys the conveyor products (22) to the image recognition device (23). The image recognition device (23) under control of the image recognition module (27) captures a picked product image (29) and by subsequent comparison to the plurality of the picked product image templates (39), as above described, associates each conveyor product (22) with the first or second conveyor lane identifier (52A)(52B). The product palletizing module (41) of the WCS (3) can further operate the PCSA (9) to sort each of the conveyor products (10) to first or second conveyor lanes (25A)(25B). This results in conveyor products (22) on first picked product list (20A) to be sorted to the first conveyor lane (25A) and the conveyor products (22) on second picked product list (20B) to be sorted to the second conveyor lane (25B). Picked products (10) or conveyor products (22) that cannot be identified by operation of the image recognition device (23) and function of the image recognition module (27) can be sorted to an unidentified picked product conveyor lane (56). Again, while the example provides first or second conveyor lanes (25A) (25B), it is not intended that embodiments be limited to two conveyor lanes and embodiments of the PCSA (9) can include a plurality of conveyor lanes (25) each having one of a corresponding plurality of conveyor lane identifiers (52).

The updated product picking module (15) of the WMS (8) can further instruct the second picker (7B) to pick the picked products (10) in the first product list (20A) not associated with a conveyor product indicator (22A)(22B) from the second slip (46) and place the picked products (10) from the second slip (46) on the first picked product pallet (42) and can further instruct the second picker (7B) to pick the picked products (10) in the second product list (20B) not associated with a conveyor product indicator (22A)(22B) from the second slip (46) and place the picked products (10) from the second slip (46) on the second picked product pallet (12B).

The second slip (46) can further include, a "fast case (53)." For the purposes of this invention, the term "fast case" means a location at which pre-determined picked products (54) not associated with a conveyor product indicator (22A) (22B) can be maintained discrete from the general warehouse picking area (55) and typically, but not necessarily, proximate the terminal ends (26) of one or more of the plurality of conveyor lanes (25) allowing the first or second picker (7A)(7B) to pick and place one of the pre-determined picked products (54) from the second slip (46) to the corresponding product pallet (12) in less time than picking the picked product (10) from the general warehouse picking area (55).

The updated product picking module (15) of the WMS (8) can further instruct the second picker (7B) to proceed to the unidentified picked product conveyor lane (56) to pick picked products (10) not identified by the image recognition module (27) and associated with one of the plurality of product conveyor lane identifiers (52) and to place each on the product pallet (12) with the picked product pallet identifier (14) associated with the picked product (10) in the product list (20) displayed by the product picking module (15) of the WMS (8).

As can be easily understood from the foregoing, the basic concepts of the present invention may be embodied in a variety of ways. The invention involves numerous and varied embodiments of a product palletizing system (1) and methods for making and using such product palletizing system (1) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "sorter" should be understood to encompass disclosure of the act of "sorting"—whether explicitly discussed or not—and, conversely, were there effectively disclosure of the act of "sorting", such a disclosure should be understood to encompass disclosure of a "sorter" and even a "means for sorting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the product palletizing systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A product palletizing system, comprising:
   a computer-implemented product palletizing system including a processor in communication with a memory element which contains a computer code executable to:
   depict in a graphical user interface on a display surface of a mobile device a plurality of product lists correspondingly associated with a plurality of customer identifiers, each of said plurality of product lists containing a plurality of products;
   associate a pallet identifier with each of said plurality of products, said pallet identifier associated with one of said plurality of customer identifiers;
   identify each conveyor product within said plurality of products in said plurality of product lists;
   depict in said graphical user interface a conveyor product indicator in association with each said conveyor product within said plurality of products in said plurality of product lists;
   operate a product conveyor sorter assembly, including:
      a conveyor which conveys each said conveyor product;
      an image recognition device which captures a product image of each said conveyor product and identifies each said conveyor product based upon comparison of said product image to a plurality of product image templates in a product image database; and
      a product sorter which sorts each said conveyor product identified by said image recognition device into one of a plurality of conveyor lanes based on said pallet identifier associated with each said conveyor product;
   depict in said graphical user interface said pallet identifier associated with one of said plurality of conveyor lanes; and
   depict in said graphical user interface said pallet identifier associated with each of said plurality of products not identified as conveyor products.

2. The system of claim 1, further comprising a first slip at which to locate conveyor products proximate to said image recognition device.

3. The system of claim 2, further comprising a second slip at which to locate said plurality of products not identified as conveyor products proximate said conveyor lanes.

4. The system of claim 3, wherein said computer-implemented warehouse management system is further executable to generate a picked product wave each associated with a picked product wave identifier, said picked product wave including one or more said product lists.

5. The system of claim 4, wherein said computer-implemented warehouse management system further executable to prioritize order in which to fill a plurality of picked product waves.

6. The system of claim 5, wherein said computer-implemented warehouse management system further executable to associate each of said one or more product lists within said picked product wave with one or more of:
   a customer identifier;
   an invoice identifier;
   a product conveyor lane identifier; and
   said product pallet identifier.

7. A product palletizing system, comprising:
   a first processor in communication with a first memory element which contains a first computer code executable to generate a plurality of product lists each one correspondingly associated with a customer identifier, each of said plurality of product lists containing a plurality of products;
   a second processor in communication with a second memory element which contains a second computer code executable to:
      depict in a graphical user interface on a display surface of a mobile device said plurality of product lists from said first memory element;
      associate a pallet identifier with each of said plurality of products in said product list;
      identify each conveyor product within said plurality of products said pallet identifier associated with one of said plurality of customer identifiers;
      depict in said graphical user interface of said mobile device a conveyor product indicator in association with each said conveyor product within said plurality of products in said plurality of product lists; and
      operate a product conveyor sorter assembly, including:
         a conveyor which conveys each said conveyor product;
         an image recognition device which captures a product image of each conveyor product and identifies said conveyor product based upon comparison of said product image to plurality of product image templates in a product image database;
         a product sorter which sorts each said conveyor product identified by said image recognition device into one of a plurality of conveyor lanes based on said pallet identifier associated with each said conveyor product;
      depict in said graphical user interface said pallet identifier associated with each one of said plurality of conveyor lanes; and
      depict in said graphical user interface said pallet identifier associated with each of said plurality of products not identified as conveyor products.

8. The product palletizing system of claim 7, wherein said second computer code is further executable to depict in said graphical user interface of said first mobile computer device an instruction to viewable by a first picker to move each said conveyor product onto said conveyor.

9. The product palletizing system of claim 8, wherein said second computer code is further executable to depict in said graphical user interface of said second mobile computer device an instruction viewable by a second picker to move each said conveyor product from each of said plurality of conveyor lanes to a corresponding one of a plurality of product pallets having said pallet identifier associated with said conveyor product.

10. The product palletizing system of claim 8, wherein said second computer code is further executable to depict in said graphical user interface of said mobile computer device an instruction viewable by said second picker to move said plurality of products not identified as conveyor product in said product list to a corresponding one of said plurality of product pallets having said pallet identifier associated with each of said plurality of products not identified as conveyor products.

* * * * *